UNITED STATES PATENT OFFICE.

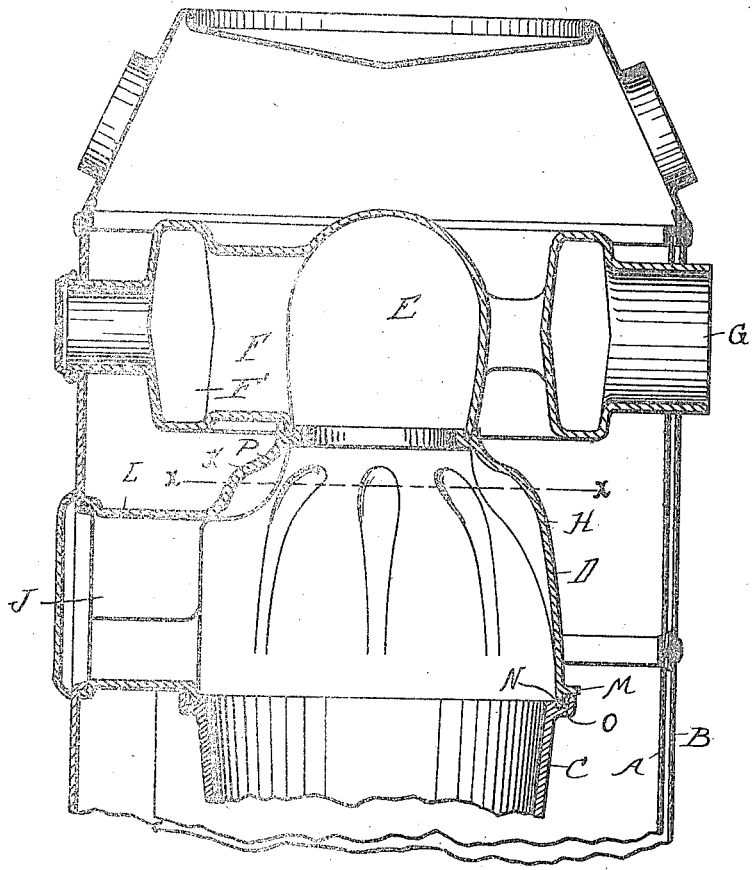
Fig-1-

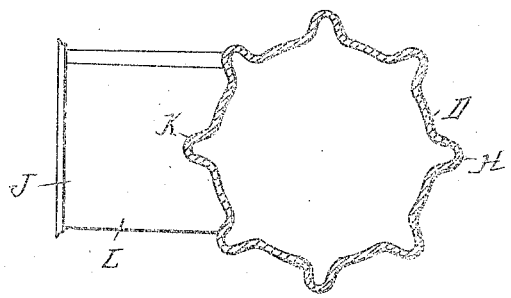
Fig-2-
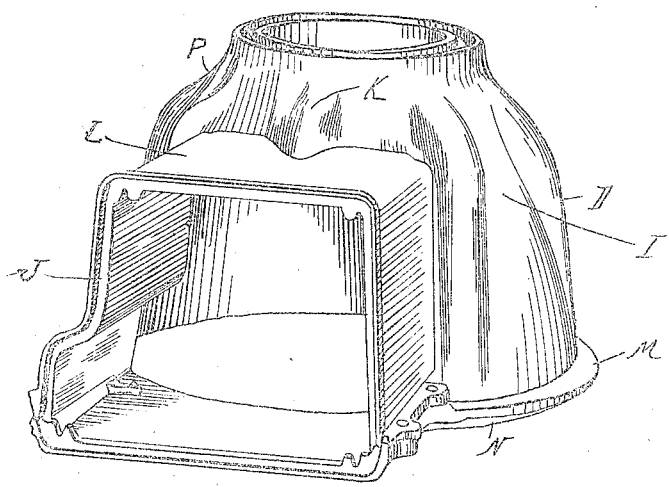
Fig-3-

GEORGE B. CARTER, OF DETROIT, MICHIGAN, ASSIGNOR TO RUDY FURNACE CO., OF DOWAGIAC, MICHIGAN, A CORPORATION OF MICHIGAN.

HOT-AIR FURNACE.

1,169,769.

Specification of Letters Patent.

Patented Feb. 1, 1916.

Application filed August 23, 1915. Serial No. 46,950.

*To all whom it may concern:*

Be it known that I, GEORGE B. CARTER, a citizen of the United States of America, residing at Detroit, in the county of Wayne and State of Michigan, have invented certain new and useful Improvements in Hot-Air Furnaces, of which the following is a specification, reference being had therein to the accompanying drawings.

The invention relates to hot air furnaces, and consists in the peculiar construction and arrangement of the combustion chamber, and certain combinations of parts as will more fully hereinafter appear.

In the drawings,—Figure 1 is a longitudinal, central section through a portion of the furnace embodying the invention; Fig. 2 is a section on the line $x$—$x$ of Fig. 1; and Fig. 3 is an enlarged perspective view of the combustion chamber.

A and B designate the lining and casing walls respectively of a hot air furnace, C the fire-pot, D the combustion chamber, E the dome at the top of the combustion chamber, and F the passageway communicating with the dome at one side of the furnace and opening into the annular radiator F'.

G is the discharge flue for the radiator F'. All of these parts, with the exception of the combustion chamber, are of well-known construction and arrangement.

The combustion chamber is of novel construction. Thus the interior of this chamber is designed to produce a very intimate mixing of the gases ascending into the combustion chamber, effecting a very complete combustion of the gases, so that little or no combustible gas will pass to the chimney. Also the external surface of the combustion chamber is of such a construction as not only to provide a very large heat radiating surface, but also to produce a rotative effect of the air current within the hood of the furnace, which equalizes the discharge from the hood exits.

As shown, the side walls of the combustion chamber are provided with hollow corrugations H that gradually increase in depth, so that adjacent the upper end of the combustion chamber they are comparatively deep and project a considerable distance from the surface I of the combustion chamber. The surface I of the chamber D converges toward the top, as is quite usual in combustion chambers, this being desirable in order to assist in effecting a commingling of the combustible products. Adjacent the upper end of the combustion chamber the circumference of the member D around the corrugations is nearly the same as the circumference of the combustion chamber adjacent the lower end thereof. I find that this arrangement is very desirable. I also find that it is highly desirable to have the deep corrugations spaced a considerable distance apart. Preferably for the standard size of hot air furnaces these corrugations are spaced apart one-eighth of the circumference of the combustion chamber. The fuel chute J is cast integral with the combustion chamber, and is of a size to occupy about one-fourth of the circumference. There is therefore one corrugation that is eliminated except at the top, as indicated at K. The short corrugation K not only adds to the symmetrical appearance of the combustion chamber but also serves as a strengthening member for the top wall L of the fuel chute.

It is customary in order to make a proper joint between the fire-pot and the combustion chamber, to provide the latter adjacent its lower edge with a flange as M, and a depending annular flange as N, and to provide the upper edge of the fire-pot with an annular groove O that receives the flange N. I have found that if the deep corrugations are extended down to the ring M, the corrugations will cause such an unequal expansion of the metal of the combustion chamber adjacent the ring that the latter will crack under the excessive heat to which the combustion chamber is subject. With my improved construction, however, I gradually decrease the depth of the corrugations toward the ring, so that just above the ring the surface is substantially plain. This eliminates the question of unequal expansion and, therefore, there is not a tendency for the ring to crack.

As will be noted upon reference to Fig. 1, the corrugations terminate a slight distance from the top of the combustion chamber and extend rather abruptly inward, forming a somewhat horizontal wall P at the top of the corrugations. The object of this arrangement is to effect a better commingling of the gases within the combustion chamber, so as to insure a complete combustion. Thus as indicated in Fig. 1, a portion of the gases rising from the fire-pot will pass into the hollow corrugations of the combustion chamber and ascend vertically therein until the gases reach the top of the corrugations. Then the horizontal wall P at the top of the corrugations will deflect the gases rising therein laterally across the top of the combustion chamber. The discharge of the laterally deflected gases into the gases ascended more or less vertically from the fire-pot, sets up cross-currents, rotative currents and the like, which not only produces a better commingling of the gases, but also tends to retard the discharging of the gases into the hood, thereby effecting a very complete combustion. The effectiveness of the gases discharging laterally from the corrugations I find is increased when the corrugations are made comparatively deep and spaced a considerable distance apart.

My improved construction of combustion chamber also provides a very large heat radiating surface for the air passing within the casing A. As the currents of air rise through the spaces between the corrugations projecting from the wall of the combustion chamber, they receive an additional share of radiant energy through the projecting side walls of the corrugations, which accelerates the flow of heated air and creates a rotative effect of the heated air within the hood of the furnace, thereby equalizing the discharge from the hood exits.

What I claim as my invention is:—

1. A combustion chamber, having a wall tapering from the bottom toward the top and having an outlet opening at the top, said wall having a plurality of outwardly-projecting corrugations spaced a comparatively wide distance apart, said corrugations being hollow on the inner sides thereof and increasing in depth toward the top of the chamber, the top of the corrugations extending inwardly for the purpose described.

2. A combustion chamber, having a wall tapering from the bottom toward the top and having an outlet opening at the top, said wall having a plurality of hollow outwardly-projecting corrugations spaced a considerable distance apart, said corrugations being comparatively deep adjacent the top and extending a considerable distance outward from the wall of the combustion chamber, and said corrugations merging into the wall of the combustion chamber adjacent the bottom of the latter.

3. A combustion chamber, having a wall tapering from the bottom toward the top and having an outlet opening at the top, said wall having a plurality of vertically-arranged outwardly-projecting corrugations spaced substantially one-eighth of the circumference of said combustion chamber, said corrugations being hollow on the inner sides thereof and being of considerable depth adjacent the top, the wall adjacent the top of the corrugations extending inwardly over the upper ends of the corrugations and said corrugations substantially merging into the wall of the combustion chamber adjacent the bottom of the latter.

4. A combustion chamber, having a wall tapering from the bottom toward the top and having an outlet opening at the top, said wall having a plurality of vertically-arranged corrugations spaced substantially one-eighth of the circumference of said combustion chamber, said corrugations being hollow on the inner sides thereof and being of considerable depth adjacent the top, the wall adjacent the top of the corrugations extending inwardly over the upper ends of the corrugations, said corrugations substantially merging into the wall of the combustion chamber adjacent the bottom of the latter, and a fuel chute cast integral and projecting laterally from the wall of the casing, said fuel chute including a top wall, and there being a short corrugation immediately above said top wall.

In testimony whereof I affix my signature in presence of two witnesses.

GEORGE B. CARTER.

Witnesses:
JAMES P. BARRY,
ARTHUR D. PULVER.